July 22, 1969    R. METZGER    3,456,379
SINKABLE FISHING FLOAT
Filed Sept. 26, 1967
FIG. 1
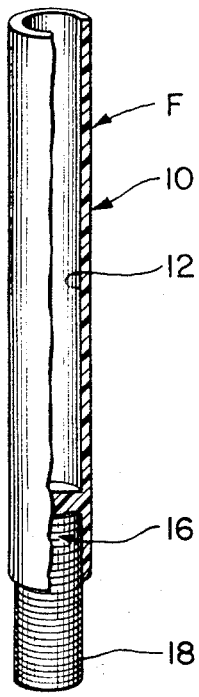
FIG. 2
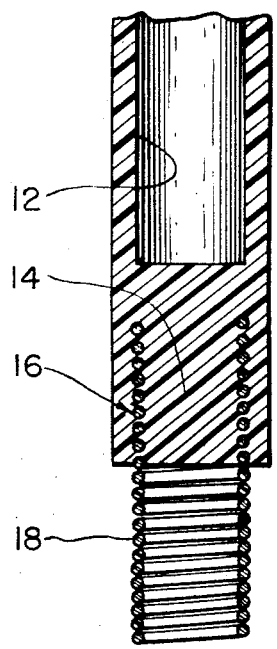
FIG. 3
FIG. 4
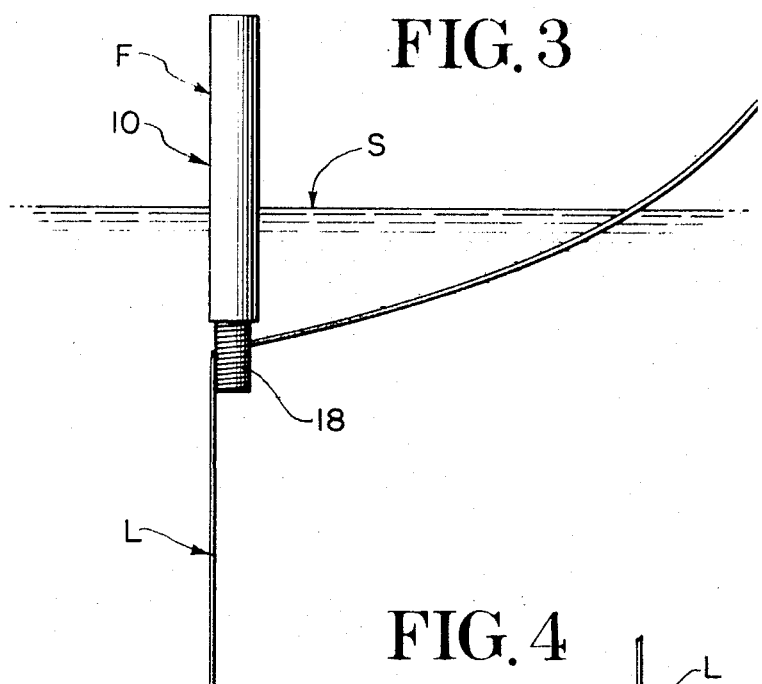
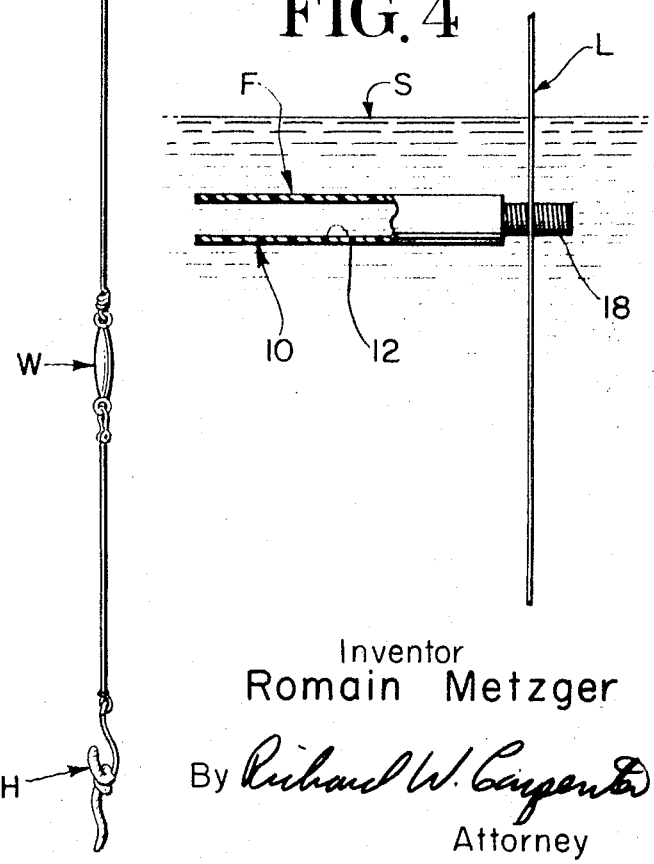
Inventor
Romain Metzger
By Richard W. Carpenter
Attorney United States Patent Office 3,456,379
Patented July 22, 1969

3,456,379
SINKABLE FISHING FLOAT
Romain Metzger, Chicago Ill., assignor to Anglers Manufacturing Corporation, Chicago, Ill., a corporation of Illinois
Filed Sept. 26, 1967, Ser. No. 670,615
Int. Cl. A01k 93/00, 95/00, 91/00
U.S. Cl. 43—43.14                                 4 Claims

ABSTRACT OF THE DISCLOSURE

A sinkable fishing float comprising a hollow cylinder open at its upper end and closed at its lower end and having at its lower end means for removably securing fishing line. When the float is pulled below the water surface by a fish it will fill with water and remain submerged near the fish.

---

The invention relates to floats for fishing lines and more particularly to a sinkable float which will remain under the surface of the water when it has been pulled under by a fish.

When a fish grabs a fish hook and pulls both the hook and a float below the surface of the water, often the fish will remove part of the bait from the hook before the hook is securely attached to the inside of the fish's mouth. If this happens and the hook becomes disengaged the standard unsinkable fishing float will immediately rise to the surface of the water and thereby pull the hook, with some bait still attached thereto, upwardly and out of the sight of the fish. The fish may not bother to look around for the hook, and a "catch" is missed.

Another disadvantage to the unsinkable float is that if a fisherman momentarily turns his head he may not see the float go down and continue to fish with an unbaited or partially baited hook.

It is therefore an object of this invention to overcome these problems by providing a float that can be carried below the surface of the water by a fish, so that if the hook becomes disengaged from the mouth of the fish it will remain close to the fish so the fish can have another opportunity to go after the bait and hook.

A more specific object of the invention is the provision of a hollow sinkable float which can be pulled below the surface of the water by a fish and will fill up with water so as to remain below the surface of the water.

Another specific object of the invention is the provision, in a fishing float of the type described, of a simple means for removably securing a fishing line to the float.

These and other objects of the invention will be apparent from an examination of the following description and drawing, wherein:

FIGURE 1 is a perspective view of a fishing float embodying features of the invention;

FIGURE 2 is a longitudinal vertical section of a portion of the structure illustrated in FIGURE 1;

FIGURE 3 is a side elevation of the structure of FIGURE 1, shown attached to a fish line and in floating position on the water; and FIGURE 4 is a view similar to FIGURE 3, but showing the fishing float after it has been pulled below the surface of the water.

It will be understood that, for purposes of clarity, certain elements have been omitted from certain views where they are believed to be illustrated to better advantage in other views.

Referring now to the drawings for a better understanding of the invention, and particularly to FIGURE 3, it will be seen that the novel float, indicated generally at F, is removably connected to a fish line L at a location inwardly from the hook H and weight W.

As best seen in FIGURE 1, the float has a generally cylindrical body 10 which is hollow throughout most of its length from the top to provide a cavity 12 open at the upper end.

At its lower end, body 10 is solid and has formed preferably integrally therewith a tightly coiled spring 16 which has a free lower end portion 18 projecting downwardly out of the lower end of the body for attachment to a fishing line L in a manner hereinafter described.

The body may be formed of any light weight waterproof material, but is preferably formed of molded plastic material. The spring is preferably formed of stainless steel or some similar non-corrosive material.

To describe the operation of the device, the float may be readily detachably connected to the line L merely by forcing the line between a pair of adjacent coils of the spring projection 18. It may be removed by merely pulling the float off of the line.

The resilience of the spring coils is strong enough to retain the float on the line in the absence of tension being applied to the line in a lateral direction relative to the axis of the float.

The force exerted by a fish would not normally be of sufficient force or direction to displace the line from the float.

After the float has been attached to the line and placed in the water it will normally ride on the water in the position illustrated in FIGURE 3.

When a fish grabs the hook and pulls the line down the float will normally tip over and fill with water to assume a position below the surface S of the water, such as is shown in FIGURE 4.

Because the float can be drawn below the water and can fill up with water so as to remain below the water surface, a partially baited hook may still be close enough to a fish so the fish can easily see it and go after the bait again.

Thus, if a fisherman sees that his float has gone under the water and if he feels no "pull" on the line he can logically assume that a fish has pulled the float under and he should immediately pull in the line and check to see whether there is sufficient bait on the hook to continue fishing.

Thus, the novel float actually serves two useful purposes: one, to permit a fish to have more than one chance at the baited hook if it slips out of his mouth before all the bait is gone; and, two, to aid the fisherman in indicating that a fish has taken the hook.

The simplicity of the float attaching means makes it easy for a fisherman to attach the float to a line, remove the float from the line, or change the position of the float on the line.

What is claimed is:
1. A sinkable float for a fishing line, comprising:
 (a) an elongated, hollow, one-piece, cylindrical tube having its upper end open at all times and its lower end closed at all times;
 (b) said tube having, at its lower end, integral means for removable attachment to a fishing line;
 (c) said float when empty being of less weight than the weight of the water displaced by it, so that it will float on the water, and being adapted to be filled with water entering said open upper end of the tube when said float is pulled under the surface by a fish, so that said float can remain under the surface of the water near the fish.

2. A float according to claim 1, wherein said means for attachment to a fishing line is embedded in the lower end of said tube and projects outwardly therefrom in axial alignment therewith.

3. A float according to claim 1, wherein said line attachment means includes a cylindrical spring-like member having one end embedded in the lower end of said tube and having its other end free and projecting downwardly from the lower end of said tube.

4. A float according to claim 3, wherein said spring-like member has at least two adjacent resilient coils adapted to snugly receive and grip said line therebetween.

References Cited

UNITED STATES PATENTS

| | | | |
|---|---|---|---|
| 188,755 | 3/1877 | Redfield | 43—44.95 X |
| 898,784 | 9/1908 | Von Rosenberg | 43—44.95 |
| 2,495,572 | 1/1950 | Deutsch | 43—44.95 X |
| 2,793,447 | 5/1957 | King | 43—43.14 |

FOREIGN PATENTS

| | | |
|---|---|---|
| 144,288 | 11/1951 | Australia. |
| 1,036,232 | 4/1953 | France. |

SAMUEL KOREN, Primary Examiner

DANIEL J. LEACH, Assistant Examiner

U.S. Cl. X.R.

43—44.95